Jan. 20, 1959 L. U. C. KELLING 2,870,386
FOLLOW-UP CONTROL SYSTEM
Filed Oct. 5, 1955 3 Sheets-Sheet 2

Inventor:
Leroy U. C. Kelling,
by Irving F. Marshman,
His Attorney.

United States Patent Office 2,870,386
Patented Jan. 20, 1959

2,870,386

FOLLOW-UP CONTROL SYSTEM

Leroy U. C. Kelling, Waynesboro, Va., assignor to General Electric Company, a corporation of New York Application October 5, 1955, Serial No. 538,730

9 Claims. (Cl. 318—30)

This invention relates to positioning control systems, more particularly to follow-up control systems of which the driving means is utilized to drive an element or object into positional correspondence with a position director and it has for an object the provision of a simple, reliable and improved positioning system of this character. More specifically, the invention relates to follow-up control systems in which the driving means is connected to drive a position indicator into positional correspondence with the position director in response to an error signal voltage which is representative of the positional disagreement of such director and indicator.

Frequently, the driving connections between the driving means and the driven element contain backlash. Any backlash between a driving member and a driven member in such driving connections prevents such driving member, the driving means and the position indicator driven thereby from representing the true position of the driven element.

In a reversible follow-up positioning control system, the polarity of the error voltage is representative of the direction or sense of the positional disagreement between the position director and the position indicator and it energizes the driving means to rotate in the correct direction to reduce the error voltage to zero and thereby to drive the position indicator and the driven element into positional correspondence with the director. Thus, in a follow-up control system containing backlash between the driving means and driven element the driving means may drive the driven element in either direction toward correspondence with the position director, and at zero error voltage, which is representative of correspondence, the driven element may be at any position different from correspondence within the backlash zone.

If the driving element of the driving connection turns slowly and always in the same direction and stops gradually without releasing its push against the driven element, the position of the driving element and that of the position indicator are accurate indications of the position of the driven element. Accordingly, a further object of this invention is the provision in a follow-up control system of means for causing the final approach to correspondence to be made at a slow creeping speed and always in the same direction irrespective of the direction or sense of the initial positional disagreement or "error" between the position director and the position indicator.

In carrying the invention into effect in one form thereof, the driving means of a follow-up control system is controlled by means of an error voltage which is representative of the difference of the actual instantaneous position of the driven element and its desired position. This error voltage is produced by means of a position director and a position indicator which is driven by the driving means. For energizing the driving means there is provided a reversible control system having an output circuit connected to the driving means and an input circuit to which the error voltage is supplied to cause the driving means to drive the driven element and the position indicator toward correspondence with the director. Means are provided for modifying the effect of the error voltage to produce a false indication of correspondence thereby to stop the driving means when the position indicator is out of correspondence with the director a predetermined amount in one direction only, and for responding to such false indication to restart the driving means to drive the driven element slowly toward true correspondence with the position director. Thus the final approach to correspondence is always made in the same direction irrespective of the actual direction or sense of the initial positional disagreement.

For a better and more complete understanding of the invention reference should now be had to the following specification and to the accompanying drawings of which

This invention may be utilized to advantage in any positioning control system in which backlash exists between the driven element and the position indicator and in which the driven element is positioned in a static position in correspondence with a position director. For the purpose of illustration only and not for purposes of limitation, it is shown as embodied in a positioning follow-up control system such as is used for positioning an element of a machine tool in a position which is specified by numerical data recorded on a data storage medium such for example as a punched tabulating card.

Figure 1:
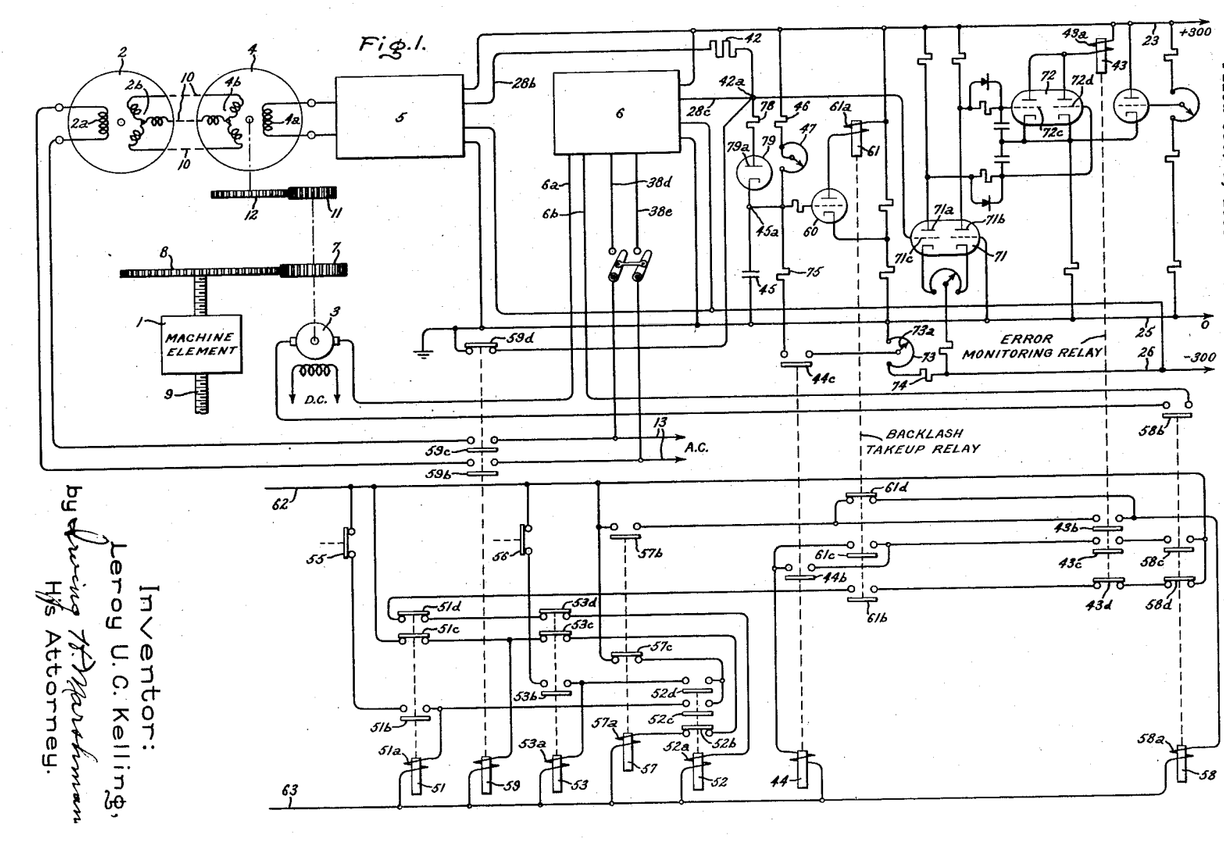
Fig. 1 is a simple, diagrammatical illustration of an embodiment of the invention.

Referring now to the drawing, an object 1 is to be driven into positional correspondence with a position director 2 by suitable driving means which is illustrated as a direct current shunt type electric motor 3. A position indicator 4 driven by the motor 3 cooperates with the position director to produce an alternating error signal voltage which is representative of the positional disagreement or "error" between the position indicator and the director and hence is representative of the positional disagreement of the driven object 1 and the director 2. By means of an error-signal amplifier and discriminator 5 the error signal voltage is amplified and is converted to a direct voltage having a polarity which corresponds to the direction or sense of the positional disagreement. This amplified and converted voltage is also representative of the positional disagreement since it is merely a rectified version of the alternating error voltage. This direct error voltage is utilized to control an electric valve-type reversing motor control system 6 to supply to the motor 3 direct voltage of the correct polarity to cause it to drive the driven object 1 and the position indicator 4 into positional agreement or correspondence with the position director.

The driven object 1 may be any body or member which it is desired to drive into correspondence with the director. For example, it may be an element of a machine tool such as the movable work-supporting table of a Wiedemann punch press and the motor 3 may be the longitudinal drive motor for such table. The element 1 is connected to the drive shaft of the motor 3 by any suitable driving connections such as the gears 7 and 8 and the lead screw 9 with which it is in threaded engagement. Substantial backlash is assumed to exist between the lead screw and the driven element.

The position director 2 may be any suitable type of electrical control device having two relatively movable members for producing a control voltage. Such control device may be either of the direct current type or the alternating current type. The direct current type may be a ring-type potentiometer having a stator member upon which is mounted a resistance element and a rotor member upon which is mounted a contact which makes sliding contact with the resistance element. The alternating current-type device is usually an induction-type device and is referred to by such terms as selsyn, synchro or rotary induction device. It is physically similar to a wound rotor motor in that it has a stator member and a rotor member upon one of which is mounted a primary winding and upon the other of which is mounted a secondary winding. Rotary induction devices lend themselves to relatively simple illustration, and consequently, in the drawings and in the following specification the director and position indicator are illustrated as comprising control devices of the rotary induction type and are referred to hereinafter as selsyns. Accordingly, the position director is illustrated as a selsyn having a rotor member and a stator member on one of which is mounted a single phase primary winding 2a and upon the other of which is mounted a three-element secondary winding 2b. Similarly, the position indicator 4 is a selsyn having a rotor member and a stator member on one of which is mounted a three-element primary winding 4b and on the other of which is mounted a single phase secondary winding 4a. Although either winding may be mounted on the stator and the other on the rotor, it is assumed that the single-element windings of the position director and position indicator selsyns are mounted on the rotor members and that the distributed 3-element windings are mounted on the stator members. By means of conductors 10, the terminals of the 3-element secondary winding 2b of the position indicator 2 are connected to corresponding terminals of the 3-element primary winding 4b of the position indicator 4. The rotor member of the position indicator is mechanically connected to the drive shaft of motor 3 by suitable driving connections such as the meshing gears 11 and 12.

From a suitable source such as the alternating voltage supply terminals 13, single-phase alternating voltage is supplied to the primary winding 2a of the position director. Alternating voltages are induced in the 3-coil elements of the secondary winding 2b. These induced voltages are supplied to the coil elements of the primary winding 4b of the position indicator. Consequently, a single phase voltage is induced in the secondary winding 4a. This induced voltage has the same phase and frequency as the voltage of the supply source 13 and has a magnitude which is dependent upon the angular relation between the coil axes of the primary winding 2a of the director and the secondary winding 4a of the position indicator.

The position indicator selsyn 4 is considered to be in correspondence with the position director selsyn 2 when the output voltage of the indicator 4 is zero, and has a specific phase relation to that of the alternating line voltage for deviations from such zero voltage position in a specified direction. For example, when the primary winding 2a and the secondary winding 4a are in correspondence, zero voltage is induced in winding 4a. In this connection, the windings 2a and 4a are considered to be in correspondence when the axis of winding 4a is perpendicular to the axis of the magnetic field produced by winding 4b. On the other hand, when the axes of the windings 2a and 4a are 90° out of correspondence, the voltage induced in the secondary winding 4a is a maximum and when 180° out of correspondence, the voltage is again zero. In other words, for intermediate positions between correspondence and 180° out of correspondence, the amplitude of the alternating voltage induced in the secondary winding 4a varies sinusoidally and reverses in phase at the 180° position.

In order that the motor 3 may be energized to drive the table 1 in the desired direction, the voltage induced in the winding 4a after suitable modification by electronic means is utilized to control the energization of the reversing motor control system 6 from which the motor 3 is supplied. This alternating error voltage is amplified and converted to a direct voltage by suitable means, such for example as the error signal voltage amplifier and discriminator 5 which is illustrated in detail in Fig. 2. It is shown as comprising a twin triode cathode-coupled amplifier valve 14. Preferably, this valve is a 6SN7GT high vacuum valve, although other types of amplifier valves may be employed if desired. The output voltage of the amplifier appears at the anodes 14a and 14b and through a transformer 15 of which the primary winding 15a is connected across anodes 14a and 14b, the amplified error voltage is supplied to the anode-cathode circuits of an electric valve-type discriminator having a single-ended output. Preferably, this discriminator comprises two twin triode high-vacuum valves 16 and 17. The anodes 16a and 17a of these valves are connected to opposite terminals of a first secondary winding 15b and their cathodes 16f and 17f are connected in common to its centertap through resistors 18 and 19. Similarly, the anodes 16b and 17b are connected to opposite terminals of a second secondary winding 15c of which the centertap is connected through resistors 20 and 18 to the cathodes 16c and 17c.

Figure 2:
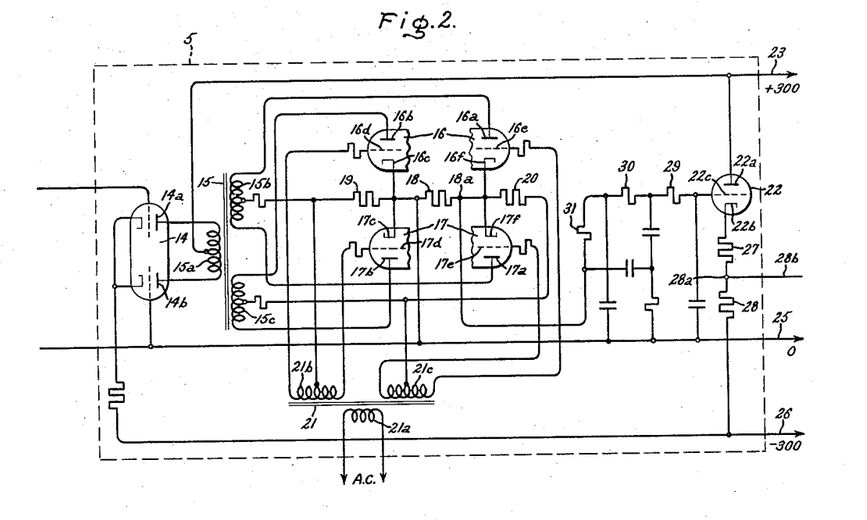
Figs. 2 and 3 are details.

To the input control circuits of both valves 16 and 17 are supplied alternating voltages of the same frequency and phase as those of voltages which are supplied to the anodes. In this connection, control electrodes 16d and 17d are connected to opposite terminals of the secondary winding 21b of the control electrode supply transformer 21 of which the primary winding 21a is connected across the alternating voltage supply terminals 13. Its centertap is connected through resistor 19 to cathodes 16c and 17c. Similarly, the control electrodes 16e and 17e are connected to opposite terminals of a secondary winding 21c of which the centertap is connected through resistor 20 to cathodes 16f and 17f.

Briefly, the operation of the discriminator is as follows: In the condition of correspondence between primary winding 2a of the director and secondary winding 4a of the position indicator, zero voltage is supplied to the amplifier 14 and the anode circuit of the discriminator; consequently, the valves 16 and 17 do not conduct and the voltage across the resistor 18 is zero. Any error, i. e., angular disagreement of the rotor winding of the position indicator with the rotor winding of the director results in supplying to the control electrode circuit of the amplifier valve 14, an alternating voltage which is representative of the error. The output voltage of the amplifier which appears across the anodes 14a and 14b is supplied to the anodes of valves 16 and 17. For one direction of error, the voltage supplied to anodes 16a and 17a will be in phase with the voltage supplied to the control electrodes 16e and 17e and the voltage supplied to anodes 16b and 17b will be 180° out of phase with the voltages supplied to the control electrodes 16d and 17d. Conduction will take place in the right hand conducting paths of valves 16 and 17 and the left hand paths will be non-conducting. Consequently, there will appear across the output circuit resistor 18 a direct voltage which is positive at its right hand terminal 18a and has a value which is approximately proportional to the magnitude of the error, for small values of error.

Figure 3:
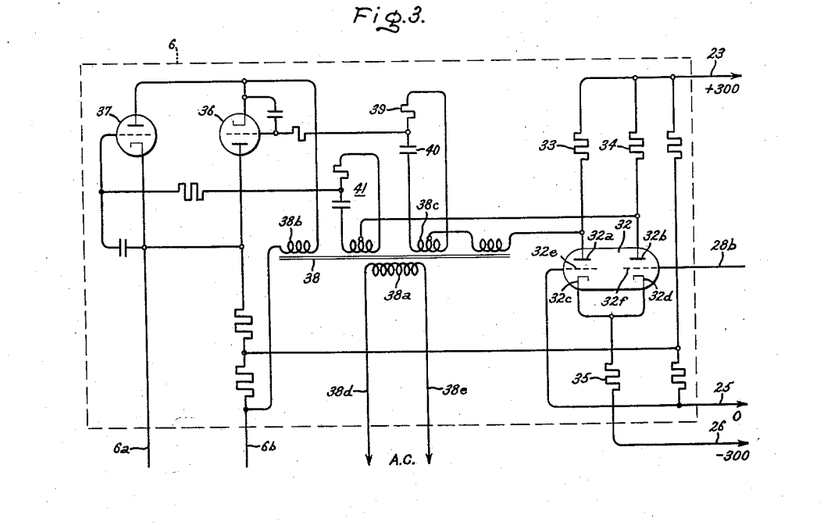

For an error of opposite direction, a direct voltage of reverse polarity will appear across the terminals of output resistor 18. Thus there is produced across the output resistor of the discriminator a direct voltage having a polarity which corresponds to the direction of the error and a magnitude which is approximately proportional to the error for small values thereof. The voltage across the output resistor 18 of the discriminator is supplied to the input circuit of an amplifier of the cathode follower-type. This cathode follower comprises an electric valve 22 which may be any suitable type of valve such as one-half of a 6SN7GT high-vacuum valve. It is supplied from a suitable source of direct voltage such as represented in Fig. 1 by conductors 23, 25 and 26 which provide four different levels of voltage. The voltage of supply conductor 25 may be considered to be at ground or zero potential; that of conductor 23 to be 300 volts positive with respect to ground; and that of conductor 26 to be 300 volts negative with respect to ground. The anode 22a of cathode follower valve 22 is connected to the 300-volt positive supply conductor 23 and its cathode 22b is connected through cathode resistors 27 and 28 to the 300-volt negative conductor 26. To the input or control electrode circuit of the cathode follower valve is supplied the output voltage of the discriminator, i. e. the voltage across the output circuit resistor 18. This cathode follower input circuit includes the discriminator output resistor 18 and is traced from control electrode 22c through resistors 29, 30 and 31 and discriminator output resistor 18 to the 0-volt supply conductor 25. In operation, the voltage of the cathode closely follows the voltage of the control electrode, trailing behind it just sufficiently to produce the change in control electrode to cathode voltage necessary to effect the desired change in cathode current. The output voltage may be derived from across the total cathode circuit resistors 27 and 28 or from across any selected portion of it. In the illustrated embodiment, the voltage across the cathode resistor 28 is utilized as the output voltage. It is smaller by several percent than the voltage across the output resistor 18 of the discriminator. This voltage, which is known as the error voltage is supplied to the input circuit of an amplifier stage of the reversing motor control circuit 6. As shown in Figs. 1, 2 and 3 the terminal 28a of the cathode resistor is connected by means of conductors 28b and 28c to the input circuit of the amplifier.

This amplifier as illustrated in Fig. 3, comprises a pair of matched electric valves such as the twin triode electric valve 32 of which the anodes 32a and 32b are connected through equal resistors 33 and 34 to the 300-volt positive supply conductor 23, and cathodes 32c and 32d are connected through a common resistor 35 of relatively high value to the −300 volt supply conductor 26. To the zero volt supply terminal 25 is connected the control electrode 32e of the left to provide a reference voltage of zero for the hand conducting path whereas the control electrode 32f is connected through conductors 28c and 28b to the common terminal 28a of cathode resistors 27 and 28 of the cathode follower so that the output voltage across resistor 28 is supplied to the input circuit of the cathode-coupled amplifier 32 as a control voltage. The voltage across the anodes 32a and 32b is utilized as the output voltage of the amplifier and is supplied to the input control circuits of two thyratrons 36 and 37 to which the armature of the motor 3 is connected through conductors 6a and 6b. Preferably, these thyratrons are reversely connected in parallel so that the thyratron 36 when conducting supplies current to the armature of the motor 3 for rotation in the forward direction and the thyratron 37 when conducting supplies current to the armature for rotation in the reverse direction. Consequently, the thyratron 36 is referred to as the forward thyratron and the thyratron 37 is referred to as the reverse thyratron.

Following is a short description of the operation of the cathode-coupled amplifier 32. As long as the voltages of both control electrodes 32e and 32f are equal, the voltages of both anodes are equal and consequently equal voltages of opposite polarities are supplied to the input circuit of thyratrons 36 and 37. However, if the voltage of the control electrode for one conducting path varies slightly with respect to the voltage of the other, current of the first conducting path as well as the RI drop in the common cathode resistor 35 changes and this produces a change in the opposite sense in the current in the other conducting path. For example, assume that the voltage of control electrode 32f becomes more negative. Current in the right hand conducting path decreases correspondingly thereby effecting a decrease in the voltage across the cathode resistor 35 and lowering the voltage of the cathode to a value closer to the fixed voltage of control electrode 32e. This increases the current in the left hand conducting paths sufficiently to restore the original total cathode current, i. e. to restore the sum of the currents flowing in both conducting paths approximately to its original value.

Voltage is supplied to the armature of table drive motor 3 from the secondary winding 38b of the transformer 38 to the terminals of which secondary winding the armature is connected through the forward and reverse thyratrons 36 and 37. As shown in Figs. 1 and 3, the primary winding 38a is connected to the supply terminals 13.

The anode 32a of the cathode-coupled amplifier is connected to the input control circuit of forward thyratron 36 and included in this connection is a static phase-shift bridge network of which in a resistor 39, a capacitor 40, and opposite halves of the secondary winding 38c of the supply transformer 38 constitute the arms. As a result of this connection, there is supplied to the input circuit of thyratron 36 a resultant voltage having an alternating component which is is de-phased with respect to its anode voltage and a direct component which is variable in magnitude and is a function of the difference between the error voltage output of the cathode follower and the counter voltage of the motor. The effect of variation of the resultant voltage on the conduction of the thyratron is to vary its firing point in each positive half cycle of its anode voltage in accordance with variations in the magnitude of the direct component. A similar static phase-shift circuit 41 is connected between the input control circuit of reverse thyratron 37 and the anode 32b of the cathode-coupled amplifier.

In the balanced condition of the system, i. e. when the rotors of the position director selsyn 2 and the position indicator selsyn 4 are in correspondence, the voltage across the resistor 18 of the discriminator is zero. Consequently, the voltage of the terminal 28a in the cathode follower circuit will have a value such that both halves of the cathode-coupled twin triode 32 are conducting equal amounts of current and approximately in mid-range. Such equal conduction of both halves of valve 32 produces at the anodes 32a and 32b equal voltages of such magnitude that the thyratrons 36 and 37 supply in opposite directions the armature of the motor equal but relatively small amounts of current with the result that the motor is held at standstill.

If the selsyns of the position director and position indicator are not in correspondence, an error is said to exist, and as previously explained, a direct voltage representative of such error appears across the output resistor 18 of the discriminator. Assuming that the error is in a direction which is designated as the forward direction, the voltage is positive at the terminal 18a and the current conducted by the cathode follower 22 increases thereby making the voltage at terminal 28a of cathode more positive. This results in increasing the current conducted in the right hand path of valve 32 and decreasing it in the left hand path thereby to make the voltage of the anode 32a more positive than the voltage of anode 32b. The more positive voltage at anode 32a advances the firing point of the forward thyratron 36 thereby causing it to supply to the armature of the motor 3 an increased amount of current. Conversely, the more negative voltage of anode 32b retards the firing point of reverse thyratron 37 causing it to cease conduction. As a result, motor 3 rotates in a forward direction thereby rotating the rotor of the position indicator selsyn 4 toward correspondence with the rotor of the position director selsyn 2. Simultaneously, it drives the table 1 in a forward direction.

Upon arrival of the rotor of the position indicator in correspondence with the rotor of the director, the output voltage of the winding 4b becomes zero. Likewise, the voltage across the output resistor 18 of the discriminator vanishes and as a result, the motor 3 stops and the table 1 is brought to rest in a position which, if there were no backlash between it and the lead screw 9, would correspond accurately to the angular position of the rotor of the position director 2.

If the original angular disagreement of the rotors of the position indicator and the director had been in the reverse direction, the polarity of the voltage which appeared across the output resistor 18 of the discriminator would have been reversed. In consequence, the motor 3 would have been energized for rotation in the reverse direction to drive the rotor of the position indicator toward correspondence with the rotor of the director and the table 1 would have been driven in the reverse direction and brought to standstill in a new position. If there were no backlash between the table and the lead screw 9 this new position would correspond accurately with the position of the rotor 2a of the position director.

However, it has been assumed that backlash does, in fact, exist between the table 1 and the lead screw 9. In the absence of any provision for counteracting the effect of such backlash, the table will invariably not be brought to rest in true correspondence with the position director in positioning operations resulting from errors of opposite direction or sense. In the condition of true correspondence between the position indicator and the position director, the table may be out of correspondence with the position director by any amount within the backlash zone. This undesirable operating condition is eliminated by the provision of means for causing the system always to approach correspondence in the same direction irrespective of the direction or sense of the initial positional disagreement. This is accomplished by the provision of means for supplying to the error voltage circuit a very small bias voltage of invariable polarity which causes the follow-up system to function preliminarily during each positioning operation to bring the position indicator to rest always in a position out of correspondence with the position director in the same direction by a small amount which is just sufficient to counteract such bias voltage; and then gradually reducing the bias voltage to cause the drive motor to drive slowly and smoothly without overshooting until the bias voltage is reduced to zero. A preferred form of means for supplying the bias voltage comprises a voltage dropping resistor 42 in the error voltage circuit, a relay 43 connected to be responsive to error voltage and consequently referred to as the error monitoring relay, and a second relay 44 controlled by the error monitoring relay. This error monitoring relay is illustrated, described and claimed in an application of Leroy U. C. Kelling and Lawrence R. Peaslee, Serial No. 478,632, Automatic Programming Control System, filed December 30, 1954, now Patent No. 2,848,670 issued August 19, 1958. The gradual reduction of the bias voltage is accomplished by means of a capacitor 45 in the error voltage circuit which is charged to the value of the bias voltage and is subsequently charged to the opposite polarity through resistors 46 and 47 in response to operation of the relay 44. The rate of charging is such that the voltage drop across resistor 42 decreases slowly and thus causes the motor 3 to operate very slowly and smoothly at a "creep-in" speed. Because the capacitor 45 is controlled by relay 44, the relay is known as the "creep-in" relay.

Figure 4:
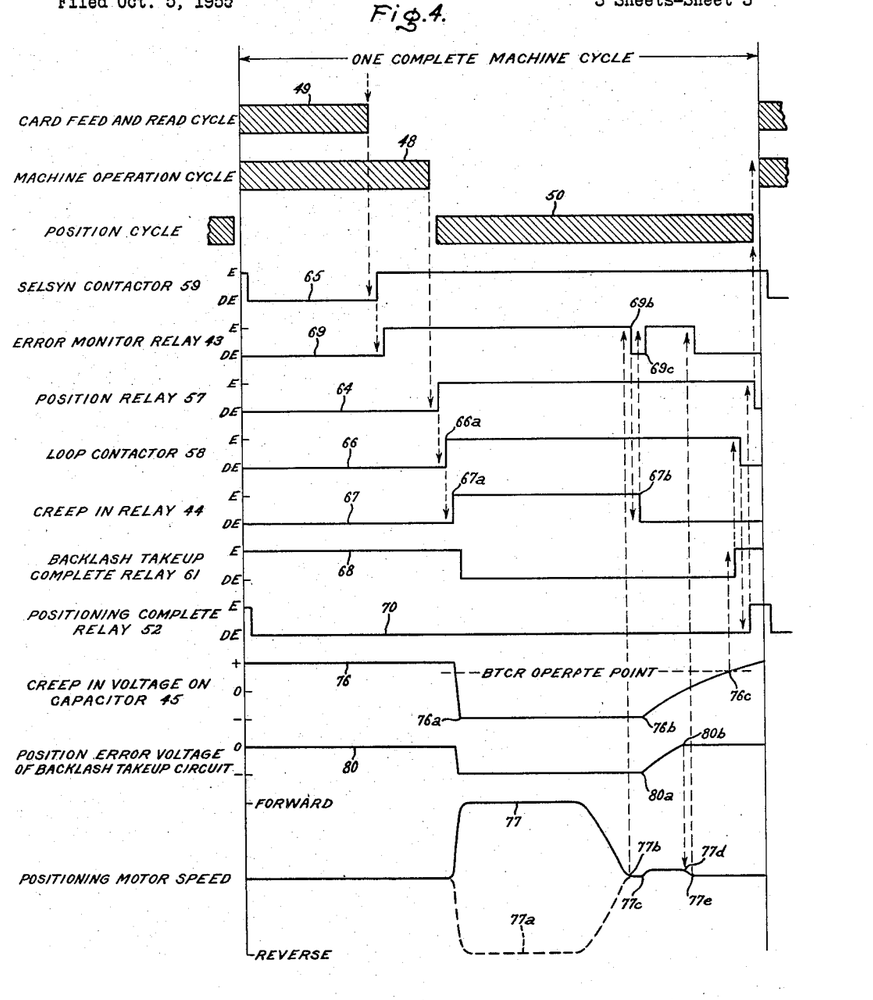
Fig. 4 is a chart of characteristic curves and symbols which facilitate an understanding of the invention and its operation.

For the purpose of illustrating an application of the invention to a useful and practical industrial purpose, it was assumed that the driven element 1 was the work-supporting table of a Wiedemann turret punch press and that the follow-up control system embodying the invention was controlled by numerical data recorded on a data storage medium such as a punched tabulating card to drive the table to a position instructed by such recorded data. For the purpose of converting such stored numerical data into angular rotation of the director selsyn 2, a card reader and selsyn positioner controlled thereby are provided. Such card reader and selsyn positioner constitute no part of the present invention and accordingly they are not illustrated in the drawing. Following the arrival of the table at an instructed position, the turret press performs its own machine operating cycle. Such cycle is represented in Fig. 4 by the shaded area 48. While the press is performing its own machine operating cycle, the card reader is performing a feed and read cycle and also setting limit stops for positioning the director selsyn 2 for the next succeeding table positioning cycle. Such feed and read cycle is represented in Fig. 4 by the shaded area 49. Upon completion of the present machine operating cycle, and also following completion of the current read and feed cycle, the follow-up control system positions the table 1 for the next machine operating cycle. Such positioning cycle is represented in Fig. 4 by the shaded area 50.

For the purpose of correlating these three separate cycles, a plurality of limit switches and sequencing relays having suitable interlocking circuits are provided.

In this connection a card feed and read relay 51 is provided for initiating the card feed and read cycle of the card reader in response to operation of a relay 52 at the completion of the positioning of the table. The relay 52 is known as the positioning complete relay. A relay 53, also under the control of the positioning complete relay 52 initiates the machine operating cycle of the turret punch press. It is referred to as the machine operating cycle relay. A limit switch 55 on the card reader serves to deenergize the card feed relay 51 at the completion of the card feed and read cycle and similarly a limit switch 56 on the turret punch press serves to deenergize the machine operating relay 53 upon completion of the machine operating cycle. The limit switch 55 is referred to as the card feed and read complete switch and the limit switch 56 is known as the punching complete switch.

Jointly controlled by the card feed and read complete switch 55 and the punching complete switch 56 is a positioning relay 57, which when energized, completes a circuit for energizing a relay 58 of which the function is to complete a loop circuit between motor control 6 and the armature of the follow-up motor 3. This relay is referred to as the loop contactor.

A switching device 59, known as the selsyn contactor is under the control of the card feed relay 51 and serves to complete the connection of the primary winding 2a of the selsyn director to the alternating voltage source 13 upon completion of the card feed and read cycle.

An electric valve 60 controlled by the voltage of the capacitor 45 and a relay 61 controlled by the valve 60 functions to open the loop contactor 58 and to energize the positioning complete relay 52 upon completion of the positioning cycle. Since the backlash in the system is completely removed prior to completion of the positioning cycle, relay 61 is called the backlash take-up complete relay which is abbreviated as BTCR.

With the foregoing explanation of the elements and their organization in the complete system, the operation of the system itself will readily be understood from the following detailed description.

The present feed and read cycle is initiated by the energization and pick-up of the card feed relay 51 and the operating cycle of the punch press is initiated by the energization and pick-up of the machine operating relay 53. Consequently, during the feed and read cycle as represented by shaded area 49, the relay 51 is picked up and during the machine operating cycle which is represented by the shaded area 48, the relay 53 is picked up. During the feed and read cycle, the relay 51 is maintained picked up by means of a sealing-in circuit which is traced from the upper terminal 62 of the control voltage supply source through the closed contacts of card feed and read complete switch 55, sealing-in contacts 51b of relay 51, coil 51a to the lower terminal 63. Similarly, the sealing-in circuit for the machine operating relay 53 extends from the supply terminal 62 through closed contacts of the punching complete switch 56 of the punch press, sealing-in contacts 53b and coil 53a to the control voltage supply terminal 63. The final step in the card feed and read cycle is the positioning of the rotor of the position director selsyn 2 to a position which is specified on the card which is being read. This is accomplished by mechanism in the card reader which is not illustrated since it constitutes no part of the present invention. Such a card reader and a director selsyn position is illustrated, described and claimed in application of Leroy U. C. Kelling, Serial No. 514,138, Director Positioning System, filed June 9, 1955, now Patent No. 2,820,186, issued January 14, 1958, and assigned to the same assignee.

During this portion of the operation, the positioning relay 57 is deenergized since the circuit of its operating coil is opened at the contacts 51c and 53c of a card feed and read relay 51 and at the contacts 53b of the machine operating relay 53. The deenergized condition of the position relay 57 is represented in Fig. 4 by the portion of the curve 64 of which the ordinate is associated with the legend DE. Likewise, the energizing circuit for the operating coil of the selsyn contactor 59 is interrupted by the contacts 51c and consequently its contacts 59b and 59c are open with the result that the director selsyn 2 is unexcited. The deenergized and dropped-out condition of the selsyn contactor is represented in Fig. 4 by the portion of the curve 65 which is associated with the legend DE.

Since the position relay 57 is deenergized, its contacts 57b are open and interrupt the energizing circuit for the operating coil 58a of the loop contactor, with the result that its contacts 58b in the motor armature circuit and contacts 58c are opened. This is indicated in Fig. 4, by the portion of the curve 66 having the ordinate DE. As a result of contacts 58c in the operating coil circuit of the creep-in relay 44 being open, the latter is deenergized and opened which condition is graphically illustrated in Fig. 4 by the portion of the curve 67 having the ordinate DE.

Owing to the conduction of valve 69 which was initiated by the charging of the capacitor 45 at the end of the previous positioning cycle, the backlash take-up complete relay 61 is energized and picked up. Its energized condition is represented graphically in Fig. 4 by the portion of the curve 68 which has the ordinate E.

Since the selsyn contactor 59 is open, and the director selsyn is unexcited, there is no error voltage and consequently the error-monitoring relay 43 is deenergized and opened. This is shown in Fig. 4 by the portion of the curve 69 which has the ordinate DE. Since the contacts 51d of relay 51 and contacts 53d of relay 53 are open, the position complete relay 52 is deenergized and open; this condition is illustrated in Fig. 4 by the portion of the curve 70 which has the ordinate DE.

At the completion of the card feed and read cycle, the contacts of the card reader limit switch 55 open and deenergize the operating coil 51a of the card feed relay 51. Responsively to deenergization, relay 51 closes its normally closed contacts 51c to complete an energizing circuit for the operating coil of the selsyn contactor 59. In response to energization, the selsyn contactor closes its contacts 59b and 59c to connect the primary winding 2a of the director selsyn 2 to the alternating voltage source 13. As a result, the director selsyn 2 is energized. Since the selsyn position indicator 4 is not in correspondence with the director 2, an error voltage is developed by the selsyns and appears across the terminals 42a and 25. This error voltage is amplified by means of a two-stage electronic amplifier of which the twin triode electric valve 71 constitutes the first stage and a similar twin triode electric valve 72 constitutes the second stage. As shown, the control electrode 71c of the left hand half of the first stage valve is connected to the error voltage terminal 42a. The output voltage of the first stage valve is taken across its anodes 71a and 71b and is supplied to the input control electrodes 72c and 72d of the second stage valve. Since the operating coil 43a of the error-monitoring relay 43 is connected to the output circuit of the second stage valve 72, the relay 43 responds to the amplified error voltage and closes its normally open contacts 43b and 43c and opens its normally closed contacts 43d in the operating coil circuit of the positioning relay 52. Thus, as long as an error signal voltage persists, the positioning complete relay 52 cannot be energized and picked up.

At the end of the machine operating cycle 48, the punching complete limit switch 56 opens its normally closed contacts to deenergize the operating coil of the machine operating relay 53. Dropping out, relay 53 closes its normally closed contacts 53c to complete an energizing circuit for the operating coil 57a of the position relay which picks up and closes its normally open contacts 57b to complete an energizing circuit for the operating coil of the loop contactor 58. This circuit is traced through the contacts 57b and the contacts 43b of the error-monitoring relay which were closed when the error-monitoring relay picked up. Responsively to energization, the loop contactor closes its contacts 58b to complete the loop circuit between the reversing motor control 6 and the armature of the follow-up motor 3. The instant at which this occurs is represented by the point 66a on the curve 66 in Fig. 4.

Contactor 58 in picking up closes its normally open contacts 58c to complete an energizing circuit for the operating coil of the creep-in relay 44. This circuit is traced through the contacts 58c, contacts 43c of the error-monitoring relay and contacts 61c of the backlash take-up relay 61. In response to energization, the creep-in relay 44 closes its sealing-in contacts 44b in parallel with the contacts 61c of the backlash take-up relay and also closes its normally open contacts 44c to connect the terminal 42a of the bias voltage dropping resistor 42 to a point on a potentiometer 73 of which the voltage is very substantially negative with respect to ground. In this connection, it will be noted that the potentiometer 73 and the resistor 74 are connected in series relationship with each other across the zero voltage terminal 25 and the minus 300-volt conductor 26 and thus constitute a voltage divider. It will also be noted that contacts 44c in closing connected terminal 45a of the capacitor 45 to the slider 73a of the potentiometer through a resistor 75. Thus the capacitor is charged to the voltage which exists between ground and the slider 73a and the polarity of the charge is positive at the terminal connected to ground and negative at terminal 45a. The charging of the capacitor is represented by the vertical portion of curve 76 and the actual negative voltage at terminal 45a is represented by the point 76a.

Since the control electrode of triode valve 60 is connected to the terminal 45a of the capacitor, the valve is rendered non-conducting and thus the operating coil 61a of the backlash take-up complete relay 61 is deenergized. The deenergized condition of relay 61 is represented by the portion of curve 68 having the ordinate DE. In response to deenergization, relay 61 opens its normally open contacts 61b and 61c and closes its normally closed contacts 61d.

The connection of the terminal 42a to the slider 73a of which the voltage is negative in respect to ground introduces into the error-voltage circuit a bias voltage of which the amount is determined by the position of the slider. This bias voltage opposes the error voltage across the resistor 28 of the cathode follower. The error voltage is effective to cause the motor controller 6 to supply current to the armature of the motor 3 for rotation in a direction such that the rotor of the position indicator 4 is driven toward correspondence with the rotor of the position director 2. The direction of the rotation of the motor depends upon the direction of the initial positional disagreement between the position indicator 4 and the position director 2. The actual speed of the motor is represented by ordinates of curve 77. Forward rotation is represented by positive ordinates of the section of the curve which is shown in full line and reverse rotation is represented by negative ordinates of the portion of the curve 77a which is illustrated in dotted lines.

Upon arrival and only upon arrival of the rotor of the position indicator 4 in a predetermined position out of correspondence with the position director 2 such that the magnitude of the error voltage which appears across cathode follower resistor 28 is equal in magnitude and opposite in polarity to the bias voltage across the bias voltage dropping resistor 42, the motor controller 6 ceases to supply current to the follow-up motor 3. Consequently, the motor 3 stops and brings the position indicator 4 and the table 1 to rest in a position of false correspondence, i. e. a position out of correspondence with the position director 2. This stopping of the motor with the table and the position indicator out of correspondence with the position director is represented in Fig. 4 by the point 77b of the motor speed curve 77. Since the polarity of the bias voltage across resistor 42 is fixed in magnitude and unchanging in polarity, this false point of correspondence is always displaced from the point of true correspondence by the same amount and in the same direction. Thus, for errors of one sense or direction, the point of false correspondence is reached before the table 1 and position indicator 4 reach the point of true correspondence and for errors of the reverse direction or sense the point of false correspondence is reached only after the table 1 and the position indicator 4 have been driven through the point of true correspondence.

At the point of false correspondence, the error voltage across the cathode follower resistor 28 being equal in magnitude and opposite in polarity to the bias voltage across resistor 42, the sum of the two voltages becomes zero and consequently the error-monitoring relay 43 becomes deenergized and drops out. The deenergization and drop-out of relay 43 is represented by the vertical portion of the curve 69 at point 69b. In response to deenergization, relay 43 opens its normally open contacts 43b and 43c and closes its normally closed contacts 43d. Contacts 43c in opening deenergize the creep-in relay 44 which, in response to deenergization, opens its sealing-in contacts 44b and its contacts 44c in the backlash take-up circuit. The opening of contacts 44c disconnects the terminal 42a from the slider 73a and also results in the connection of the negative terminal 45a of the capacitor 45 through resistors 46 and 47 to the 300-volt positive supply terminal. The deenergization and drop-out of the creep-in relay 44 is represented by the vertical portion of curve 67 at point 67b and the reconnection of the capacitor terminal 45a from a point of negative voltage to a point of positive voltage is represented by the point 76b of curve 76.

Owing to the opening of contacts 44c, the capacitor begins to charge to the opposite polarity in accordance with the portion of the curve 76 between points 76b and 76c. As shown, the terminal 42a is connected through a resistor 78 and a diode electric valve 79 to terminal 45a of the capacitor. Consequently, as the voltage at the capacitor terminal 45a rises, i. e. becomes less negative, the voltage of the terminal 42a rises correspondingly in accordance with the portion of the curve 80 between the points 80a and 80b. In this connection the curve 80 actually represents the voltage of the anode 79a of the diode 79. The voltage of point 42a, in rising, becomes slightly more positive than ground or zero voltage thereby to cause the motor to operate at a creeping speed to drive the position indicator 4 and the load, i. e. the table 1 in the direction of true correspondence with the position director. The voltage at point 42a can only become sufficiently positive with respect to ground to initiate operation of the motor at such creeping speed. Any rotation of the motor immediately decreases the error voltage at a rate which is approximately equal to the rate at which the capacitor voltage is decreasing, i. e. becoming less negative at terminal 45a. If the motor tended to decrease the error at a faster rate, the voltage at point 42a would approach closer to ground or zero voltage and turn off the motor. Consequently, the two rates of decrease are maintained substantially constant and since they are in opposing relationship, they tend to cancel each other with the result that the slow creeping speed of the motor is maintained substantially constant as represented by the portion of the curve 77 between points 77b and 77c. The rate of charge of the capacitor 45 and consequently the creeping speed of the motor may be adjusted by means of adjustable resistor 47 in the charging circuit. In this portion of the operation, the motor can operate in only one direction since the voltage supplied to the motor control 6, when the system is at the point of false correspondence, always has the same polarity. The voltage which appears at the point 42a in response to the charging of the capacitor 45 is amplified by amplifiers 71 and 72 and causes the error-monitoring relay 43 to pick up as represented by the vertical portion of the curve 69 at point 69c. The pickup of relay 43 at this point has no effect on the control, since the relay 61 is not energized.

Since the rotation of the motor in the zone between false correspondence and true correspondence is always in the same direction and since the motor rotates at a smooth creeping speed in this zone, it maintains the backlash between the lead screw 9 and the table 1 completely taken up. As the voltage at the capacitor terminal 45a becomes positive of ground or zero voltage, the bias voltage across resistor 42 vanishes and the speed of the motor is smoothly decreased from the creeping speed to standstill with the position indicator 4 and the table 1 in true correspondence with the director 2.

At true correspondence, the error voltage becomes zero and the diode 79 ceases conducting. Since the diode cannot conduct in the reverse direction, the voltage at terminal 42a cannot become more positive than ground or zero voltage even though the voltage at the capacitor terminal 45a continues to rise. In response to zero voltage of the terminal 42a, the error-monitoring relay 43 becomes deenergized and drops out to open its normally open contacts 43b and 43c and close its normally closed contacts 43d.

As the voltage at the terminal 45a of the capacitor continues to rise, it becomes sufficiently positive to render the triode valve 69 conducting. In response to conduction of the valve 69, the backlash take-up complete relay 61 is energized and closes its normally open contacts 61b and 61c and opens its normally closed contacts 61d. In response to opening of contacts 61d, the loop contactor 58 is deenergized and its contacts 58b are thereby opened to interrupt the loop connection between the motor control 6 and the armature of the motor 3. The loop contactor 58 in dropping out also closes its normally closed contacts 58d to complete an energizing circuit for the operating coil 52a of positioning complete relay 52. In response to energization, the relay 52 picks up and opens its normally closed contacts 52b to interrupt the energizing circuit of the positioning relay 57.

Thereupon, the positioning relay 57 drops out to open its normally closed contacts 57b and to close its normally closed contacts 57c. The closing of contacts 57c together with the closing of contacts 52c and 52d in response to energization of the relay 52 completes an energizing circuit for the operating coils of the card feed and read cycle relay 51 and the machine operating relay 53. Relays 51 and 53 pick up in response to energization to start the next card feed and read cycle and the next punching operation of the machine. When these operations are started, the card feed and read limits switch 55 and the punching complete switch 56 reclose and consequently the relays 51 and 53 seal themselves in through their sealing-in contacts 51b and 53b respectively. In their picked-up positions, relays 51 and 53 open their normally closed contacts 51d and 53d respectively thereby to deenergize the positioning complete relay 52 which drops out to leave the system in a reset condition.

Although in accordance with the provisions of the patent statutes, this invention is described as embodied in concrete form and the principle of the invention has been described together with the best mode in which it is now contemplated in applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

I claim:

1. A follow-up control system comprising a position director, means for driving a load body, a control means for said driving means having an output circuit and an input circuit, electrical connections from said output circuit to said driving means, a position indicator having mechanical driving connections to said driving means and electrical connections to said position director and input circuit for supplying to said input circuit an error voltage to control said driving means to drive said position indicator toward correspondence with said director, and means for eliminating the backlash in the driving connections between said driving means and its load external to the driving connections between said driving means and said position indicator comprising means responsive to a first amount of positional disagreement of said director and position indicator for modifying the effect of said error voltage to produce a false indication of correspondence to stop said driving means in response to a second predetermined amount of positional disagreement in a predetermined direction and responsive to said false indication for causing said driving means to resume operation and drive said position indicator into true correspondence with said director.

2. A follow-up control system comprising driving means, control means for said driving means having an output circuit connected to said driving means and an input circuit, a position director, a position indicator, mechanical driving connections between said driving means and position indicator, electrical connections between said position indicator and said director and between said position indicator and said input circuit for supplying an error voltage to said input circuit to control said driving means to drive said position indicator toward a position of correspondence with said director and means controlled by said error voltage for supplying to said input circuit a bias voltage for producing a false indication of correspondence between said director and indicator to control said driving means to stop said position indicator in a predetermined position of disagreement in one direction only with respect to said director and responsive to said false indication for initiating a gradual reduction of said bias voltage to cause said driving means to resume operation at a creeping speed and drive said position indicator toward true correspondence with said director.

3. A follow-up control system comprising in combination, a drive motor, control means for said drive motor having an output circuit connected to supply said motor and having an input circuit, a director, a position indicator, mechanical driving connections between said motor and said indicator, electrical connections between said director and said indicator and between said indicator and said input circuit for supplying to said input circuit an error voltage varying in magnitude with the magnitude of the positional disagreement of said director and indicator to cause said motor to drive said director toward correspondence with said director at a relatively high speed, means responsive to said error voltage for supplying to said input circuit a bias voltage for producing a false indication of correspondence between said director and indicator to cause said control means to stop said motor with said position indicator in a predetermined position displaced from correspondence only in a single direction for initial positional disagreements of either direction and responsive to said false indication for effecting a gradual reduction of said bias voltage to cause said motor to resume operation and drive said position indicator at a slow creeping speed toward true correspondence and to stop said indicator in true correspondence with said director without reversal of said motor.

4. A follow-up control system comprising an electric motor, a position director, a position indicator mechanically connected to be driven by said motor and electrically connected to said director for producing an error voltage reversing in polarity with the direction of positional disagreement of said indicator and director element, control means for said motor having an input circuit connected to be supplied with said error voltage and having an output circuit for supplying to said motor a voltage reversing in polarity with the polarity of said error voltage to cause said motor to drive said position indicator toward correspondence with said director in either direction depending on the polarity of said control voltage, and means responsive to said error voltage for supplying to said input circuit a bias voltage to control said motor to stop said position indicator preliminarily in a position displaced from correspondence with said director by a predetermined amount only in one direction for initial positional disagreements of either direction and further responsive to the value of voltage supplied to said input circuit at the instant of said preliminary stopping for initiating a gradual reduction of said bias voltage to control said motor to drive said indicator from said displaced position toward correspondence in the same direction irrespective of the direction of the initial disagreement.

5. A follow-up control system comprising an electric motor, a control means for said motor having an output circuit connected to said motor and an input circuit, a position director, a position indicator mechanically connected to be driven by said motor and electrically connected to said director for supplying to said input circuit an error voltage of reversible polarity for controlling said motor to drive said indicator toward correspondence with said director in a direction depending on the direction of initial disagreement of said director and indicator, means controlled by said error voltage for supplying to said input circuit a bias voltage of the same polarity for either direction of said initial disagreement to control said motor to stop said indicator preliminarily in a position displaced from correspondence with said director a predetermined amount in the same direction for positional disagreements of either direction and means responsive to a predetermined value of the voltage supplied to said input circuit for initiating removal of said bias voltage thereby to control said motor to drive said indicator toward correspondence with said director, and means for limiting the rate of removal of said bias voltage to a relatively low rate to effect operation of said motor at a low creeping speed to drive said indicator toward and to stop said indicator in true correspondence with said director without reversal; the fixed polarity of said bias voltage confining to a single direction the final approach of said indicator to the position of true correspondence irrespective of the direction of said initial disagreement.

6. A follow-up control system comprising a drive motor, a reversing motor control for said motor comprising electric valve means provided with an output circuit connected to said motor and an input circuit, a position director, a position indicator mechanically connected to be driven by said motor and electrically connected to said director for supplying an error voltage to said input circuit to control said motor to drive said indicator toward a position of correspondence with said director in a direction corresponding to the initial disagreement of said director and indicator, a pair of voltage supply terminals, a voltage divider connected across said terminals, a voltage dropping device connected in said input circuit, a second electric valve means responsive to said error voltage and a switching device controlled thereby for connecting one terminal of said voltage dropping device to a point on said voltage divider to supply a bias voltage of unchangeable polarity to said input circuit to control said motor to stop said indicator in a position displaced from said position of correspondence a predetermined amount in the same direction for successive positioning operations of said system irrespective of the direction of said initial positional disagreement, said second electric valve means also being responsive to a predetermined value of the voltage supplied to said input circuit for disconnecting said voltage dropping device from said bias voltage thereby to control said motor to drive said position indicator from said displaced position toward said position of correspondence.

7. A follow-up control system comprising driving means, control means for said driving means having an output circuit connected to said driving means and an input circuit, a position director, a position indicator mechanically connected to be driven by said driving means and electrically connected between said director and said input circuit for supplying an error voltage to said input circuit to control said driving means to drive said position indicator toward a position of correspondence with said director, means controlled by said error voltage for supplying to said input circuit a bias voltage for producing a false indication of correspondence between said director and indicator to stop said position indicator in a position displaced from correspondence a predetermined amount in one direction only for either direction of initial disagreement and responsive to said false indication for initiating a reduction in said bias voltage, and capacitor means connected with said input circuit for limiting the rate of reduction of said bias voltage to control said motor to drive said indicator from said displaced position to true correspondence at a relatively reduced rate of speed and in the same direction for either direction of said initial disagreement.

8. A follow-up control system comprising in combination, a drive motor, control means for said drive motor having an output circuit connected to supply said drive motor and having an input circuit, a director, a position indicator mechanically connected to be driven by said motor and electrically connected to said director and to said input circuit for supplying to said input circuit an error voltage varying in magnitude with the magnitude of the positional disagreement of said director and indicator and reversing in polarity with reversals in the direction of said disagreement to cause said motor to drive said director toward correspondence with said director at a relatively high speed, means responsive to said error voltage for supplying to said input circuit a bias voltage to cause said control means to stop said motor with said position indicator in a predetermined position displaced from correspondence in a single direction only for initial positional disagreements of either direction and further responsive to a predetermined value of said error voltage for effecting a gradual reduction of said bias voltage to cause said motor to drive said position indicator at a relatively reduced speed from said displaced position to true correspondence with said director, and time delay means set in operation in response to a predetermined value of said error voltage for preventing the reestablishment of the full value of said bias voltage for a predetermined interval of time after the initiation of said reduction.

9. A follow-up control system comprising driving means, control means for said driving means having an output circuit connected to said driving means and an input circuit, a position director, a position indicator mechanically connected to be driven by said driving means and electrically connected between said director and said input circuit for supplying an error voltage to said input circuit to control said driving means to drive said position indicator toward a position of correspondence with said director, means controlled by said error voltage for supplying to said input circuit a bias voltage for producing a false indication of correspondence between said director and indicator to stop said position indicator in a position displaced from correspondence a predetermined amount in one direction only for either direction of initial disagreement and responsive to said false indication for initiating a reduction in said bias voltage, capacitor means connected to said input circuit for limiting the rate of reduction of said bias voltage to control said motor to drive said indicator from said displaced position to true correspondence with said director at a relatively reduced rate of speed, and relay means responsive to the voltage of said capacitor for preventing the reestablishment of the full value of said bias voltage for a predetermined interval of time after the initiation of said reduction.

References Cited in the file of this patent

UNITED STATES PATENTS

| | | |
|---|---|---|
| 2,399,695 | Satterlee | May 7, 1946 |
| 2,460,276 | Bernas | Feb. 1, 1949 |
| 2,537,083 | Peoples | Jan. 9, 1951 |
| 2,582,221 | Belsey et al. | Jan. 15, 1952 |

OTHER REFERENCES

Electronics in Industry, Chute, GM, McGraw-Hill, New York, 1946, Figure 16c, page 210.